United States Patent [19]
Gandrud

[11] 3,738,181
[45] June 12, 1973

[54] ROTARY DRIVE MECHANISM
[76] Inventor: Ebenhard S. Gandrud, P. O. Box 528, Owatonna, Minn. 55060
[22] Filed: Mar. 10, 1971
[21] Appl. No.: 122,781

[52] U.S. Cl. .................................. 74/13, 222/177
[51] Int. Cl. ..................... F16h 37/00, A01c 15/00
[58] Field of Search ...................... 74/13; 222/177; 56/121.4, DIG. 5; 180/53 C; 239/147, 155, 156

[56] References Cited
UNITED STATES PATENTS

| | | | |
|---|---|---|---|
| 1,854,575 | 4/1932 | Baumgardner | 74/13 X |
| 3,515,313 | 6/1970 | Siems | 222/117 |
| 3,126,748 | 3/1964 | Mostrong | 74/13 |
| 3,527,109 | 9/1970 | Gandrud | 74/13 |

FOREIGN PATENTS OR APPLICATIONS

| | | | |
|---|---|---|---|
| 558,247 | 6/1957 | Belgium | 74/13 |

*Primary Examiner*—Leonard H. Gerin
*Attorney*—Merchant & Gould

[57] ABSTRACT

A caster including a caster frame journaled in a mobile structure on a generally vertical axis, and a ground engaging wheel journaled in the caster frame. Transmission mechanism includes a rotary shaft disposed on the axis of turning movement of the caster frame, and driving connections between the caster wheel and the rotary shaft to rotate the shaft responsive to rotary travel of the caster wheel over the ground.

10 Claims, 6 Drawing Figures

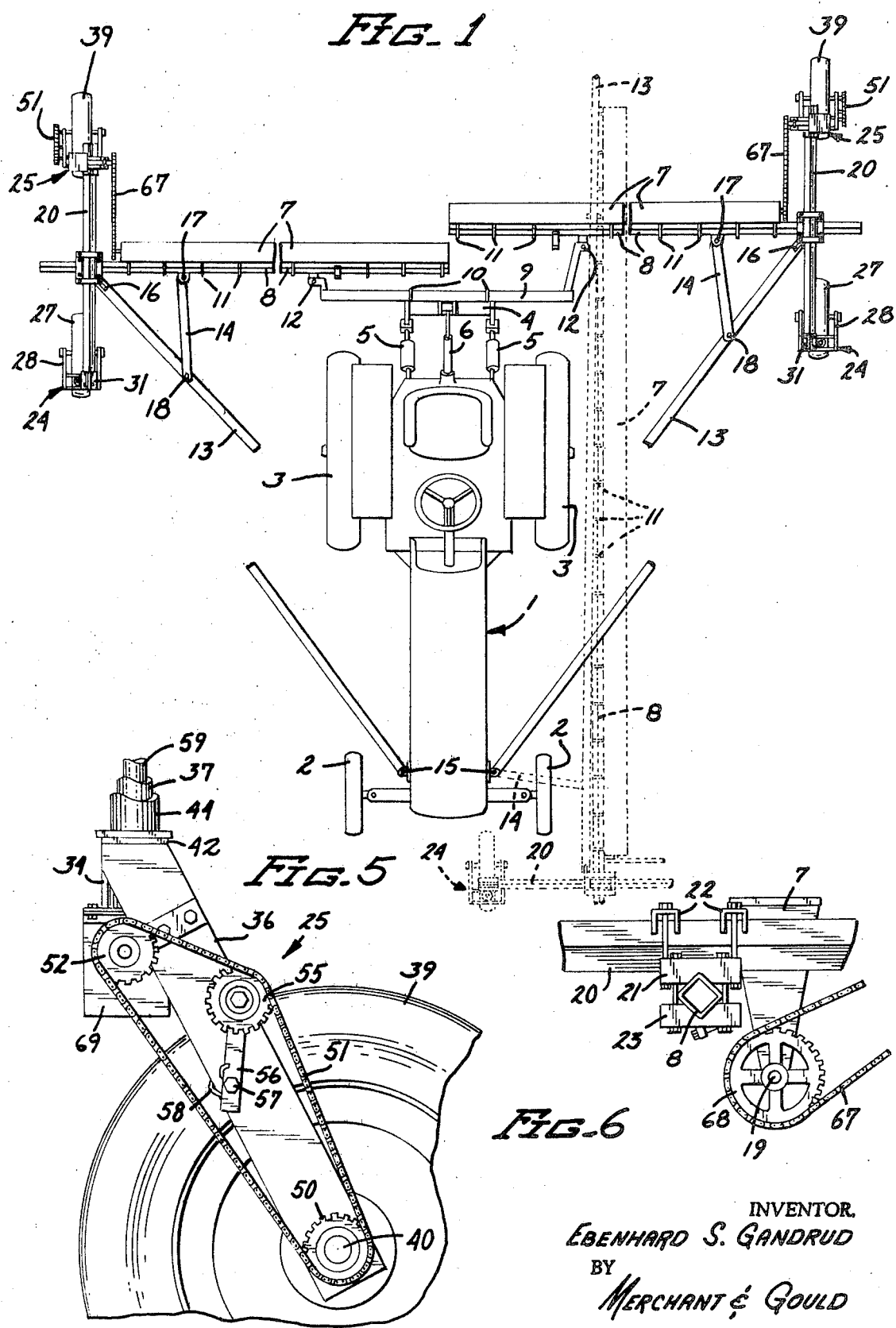

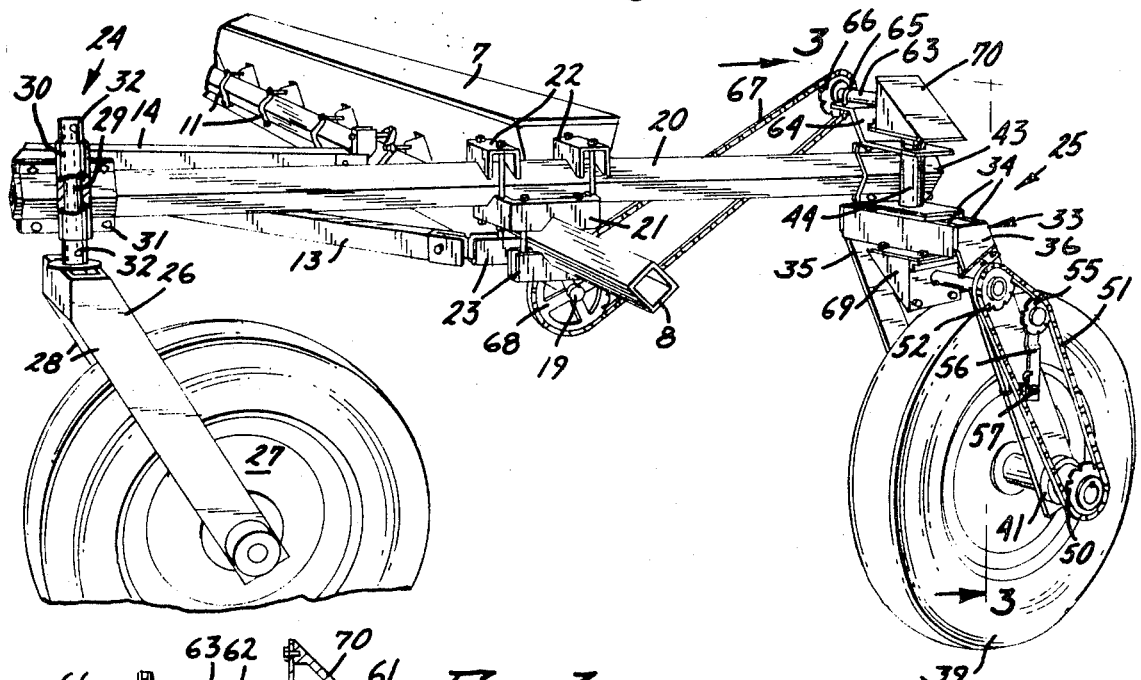
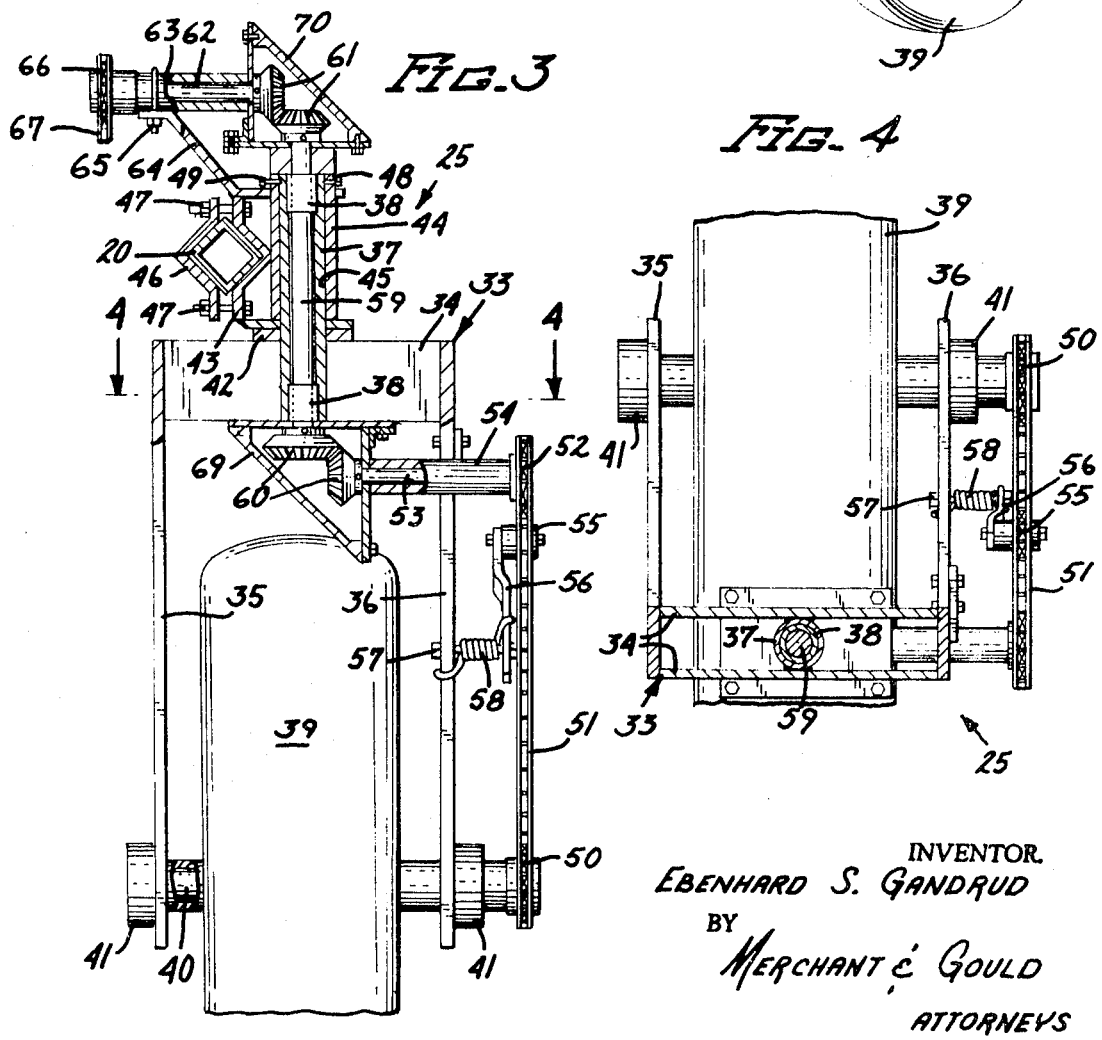

ROTARY DRIVE MECHANISM

BACKGROUND OF THE INVENTION

Ground engaging vehicle wheels having connections generally for driving devices carried by the vehicles are well known. Examples of these are found in my own prior U.S. Letters Pat. Nos. 2,563,165; 2,759,637; 2,874,879; 2,929,634; 3,213,698; and 3,220,368. Ground engaging dirigible wheels having driving connections are found in other U.S. Pat. Nos. such as 2,351,389 and 2,785,525. The dirigible or steerable wheels of these latter two patents operate satisfactorily but are capable of only limited dirigible movement.

SUMMARY OF THE INVENTION

An important object of this invention is the provision of a rotary drive mechanism utilizing a ground engaging dirigible or caster wheel capable of unlimited pivotal movement on a generally vertical steering axis, and which will impart driving movement to a device operatively connected thereto in any position of the wheel relative to its steering axis. The mechanism of this invention involves a mobile structure, a caster including a caster frame having an upper end portion rotatively connected to the mobile structure on a generally vertical axis, and a ground engaging caster wheel rotatively mounted to the lower end portion of the caster frame for rotary travel over the ground. A power transmission shaft is journaled in the caster frame on the steering axis of the caster and is operatively connected at one end to the caster wheel by drive connections mounted on the caster frame. The opposite end of the power transmission shaft is provided with means for connection to the device to be driven.

DESCRIPTION OF THE DRAWINGS

FIG. 1 is a view in top plan of a mobile agricultural implement showing the rotary drive mechanism of this invention applied thereto;

FIG. 2 is an enlarged fragmentary view in perspective of the support means and drive mechanism at one end of the implement of FIG. 1;

FIG. 3 is an enlarged fragmentary section taken substantially on the line 3—3 of FIG. 2;

FIG. 4 is a horizontal section taken on the line 4—4 of FIG. 3;

FIG. 5 is a fragmentary view in end elevation of a portion of the drive mechanism; and FIG. 6 is a fragmentary detail in end elevation, corresponding to a portion of FIG. 2.

DETAILED DESCRIPTION OF THE PREFERRED EMBODIMENT

In FIG. 1, a conventional tractor of the type generally used in agriculture, is shown in top plan and indicated generally by the numeral 1, the tractor being provided with pairs of front and rear wheels 2 and 3 respectively, and a draw bar 4 supported by fluid pressure operated cylinders 5 and linkage 6, in the usual manner. A mobile implement comprising a pair of elongated hoppers 7 is shown as being connected to the draw bar 4 by means of a pair of elongated cross sectionally rectangular bars, commonly known as tool bars 8 and a rigid supporting frame 9. The supporting frame 9 is connected to the draw bar 4 by U-bolts or similar connecting elements 10, the hoppers 7 being mounted on their respective tool bars 8 by a plurality of mounting clamps or the like 11. The supporting frame 9 is pivotally connected to each of the tool bars 8 on generally vertical axes, as indicated at 12, whereby the hoppers 7 may be moved between operative positions wherein the hoppers extend transversely of the direction of travel of the tractor 1, as shown by full lines in FIG. 1, and inoperative transport positions wherein the hoppers 7 extend generally longitudinally of the direction of travel of the tractor 1. One of the hoppers 7 is shown in its inoperative position by dotted lines in FIG. 1. The tool bars 8 and hoppers 7 are releasably held in their inoperative and operative positions selectively by elongated tow bars 13 and brace links 14 as shown in FIG. 1, the tow bars 13 are pivotally secured at their front ends to the tractor 1, as indicated at 15, and at their opposite ends to the outer end portions of the tow bars 8, as indicated at 16, the brace links 14 being pivotally secured to their respective tool bars 8 and tow bars 13, as indicated at 17 and 18 respectively. When the hoppers 7 and tool bars 8 are moved to their inoperative transport positions, the pivotal connections 15 and 18 are released, and the front ends of the brace links 14 are connected to the tractor at the pivotal connections 15.

It will be appreciated that the implement being towed by the tractor 1 may be any implement having movable parts therein which must be driven. For the purpose of the present example, the implement is in the nature of a spreader or a pair of spreaders each involving a different one of the hoppers 7 or containing granular chemical material such as fertilizer, or seed, and utilizing a rotary feeding element not shown, but terminating in a drive shaft, indicated at 19, see particularly FIGS. 2 and 6. The dispensers including the hoppers 7 and rotor shafts 19 may be assumed to be of the generaly type disclosed in may prior U.S. Letters Pat. Nos. 2,350,107 and 2,846,125.

The outer ends of the hoppers 7 and tool bars 8 are supported by mobile frame structures, comprising transverse bars 20 adjustably but rigidly connected to the tool bars 8 by clamp assemblies including intermediate clamping members 21 and pairs of upper and lower clamps 22 and 23 bolted together, one of the lower clamps of each pair thereof having thereon the pivotal connection 16 for its respective tow bar 13. The transverse bars 20 are each supported at their opposite ends by caster assemblies 24 and 25. Each caster assembly 24 includes a fork-like caster frame 26 having a pneumatic tire equipped wheel 27 disposed between and journaled at the lower ends of legs 28, each caster frame 26 including a vertically disposed spindle 29 that is journaled in a tubular bearing 30 welded or otherwise rigidly secured to a clamping device 31 for mounting the same on one end portion of its respective transverse bar 20. Pairs of stop collars 32 are secured on the spindles 29 at opposite ends of their respective tubular bearings 30, to limit axial movement of the spindles 29 in the bearings 30. The caster assemblies 24 are so constructed and arranged that the caster frames 26 are capable of unlimited rotary movement relative to their respective bars 20 on the axes of their respective spindles 29.

Except for the fact that one is of right hand and the other of left hand, the caster assemblies 25 are substantially identical, each having connections for driving an adjacent one of the rotor shafts 19. Each of the caster assemblies 25 involves a caster frame 33 which includes a pair of laterally spaced parallel plate-like head members 34, a pair of parallel legs 35 and 36 that are welded or otherwise rigidly secured at their upper ends to the opposite ends of the head members 34 and which extend angularly downwardly therefrom, and a tubular spindle 37 welded or otherwise rigidly anchored between the head members 34 and projecting generally vertically upwardly therefrom. At its opposite ends, each spindle 37 is provided with internal sleeve bearings 38 for a purpose which will hereinafter become apparent. A pair of ground engaging rotary members in the nature of pneumatic tire equipped wheels 39 are disposed one each between the legs 35 and 36 of a different one of the caster frames 33, each wheel 39 being mounted on a shaft 40 that is journaled in suitable bearings 41 mounted in the lower end portions of the legs 35 and 36. The head members 34 of each pair thereof are connected intermediate their ends by a bearing plate 42 having a central opening through which a respective tubular spindle 37 extends upwardly, the spindle 37 being welded or otherwise rigidly secured to its respective bearing plate 42.

The aforementioned frame structures include not only the transverse bars 20 but also comprise mounting frames 43 and mounting tubes 44 welded to the mounting frames 43, the tubes 44 defining generally vertically extending axial passages 45 therethrough, the frames 43 being mounted on their respective transverse bars 20 by clamps 46 and nut equipped clamping bolts 47. As shown, the lower ends of the mounting frames 43 and their respective mounting tubes 44 rest upon the bearing plates 42, and stop collars 48 encompass the upper end of each spinkle 37 and are locked thereon by set screws or the like 49 to hold their respective spindles 37 and parts carried thereby against downward movement relative to each bar 20, frame 43 and tube 44.

Each wheel shaft 40 is provided at one end with a sprocket wheel 50 over which is entrained an endless link chain 51 that runs over a second sprocket wheel 52 keyed or otherwise rigidly mounted on the outer end of a jack shaft 53 that is journaled in a tubular bearing 54 mounted on the upper end portion of the leg 36 of a respective one of the caster frames 33. A pair of idler sprockets 55 are journaled one each on one end of one of a pair of mounting arms 56. Each of the arms 56 is pivotally mounted on a mounting pin 57 projecting laterally outwardly from a respective one of the legs 36. A pair of torsion springs 58 each encompass a different one of the mounting pins 57, each spring 58 yieldingly urging its respective arm 56 and idler sprocket 55 in a direction to maintain its respective chain 51 in a taut driving relationship with the sprocket wheels 50 and 52 over which the chain is entrained. It will be appreciated that each drive chain 51 is of such length that, when either idler sprocket arm 56 is swung in a direction against bias of its respective spring 58, the adjacent chain 51 is loosened sufficiently on its respective sprocket wheels 50 and 52 to be easily removed therefrom. Thus, when it is desired, each jack shaft 53 may be rendered inoperative.

Each of the caster assemblies 25 is provided with a rotary power transmission shaft 59 that extends axially within a respective one of the tubular spindles 37 and is journaled in the bearings 38 thereof for rotation on the axis of its respective spindle 37.

The jack shaft 53 and power transmission shaft 59 of each caster assembly 25 are provided with intermeshing mitre or bevel gears 60 which transfer rotary movement of their respective jack shafts 53 to their respective power transmission shafts 59.

The power transmission train of each caster assembly 25 further includes a pair of mitre or bevel gears 61, one of which is secured to the upper end of one of the power transmission shafts 59, the other being rigidly secured to the outer end of a generally horizontally disposed output shaft 62 journaled in a bearing 63 that is rigidly secured to a bracket portion 64 of a respective one of the mounting frames 43. Each output shaft 62 is provided at its inner end with a sprocket wheel 66 having entrained thereover one of a pair of endless link chains 67. Each chain 67 further runs over a sprocket wheel 68 mounted on a respective one of the rotor bar shafts 19. It will be noted that each output shaft 62 is disposed on an axis parallel to the axis of the rotor bar shaft 19 driven thereby. Each cooperating pair of mitre gears 60 is shielded from dust, moisture or other foreign material by a housing 69, each cooperating pair of mitre gears 61 being similarly protected by a housing 70.

With the above described arrangement, the caster assemblies 25 are capable of unlimited rotary or turning movement about the axes of their respective power transmission shafts 59 and spindles 37. Driving rotation will be imparted to the power transmission shafts 59 no matter how the tool bars 8 and transverse bars 20 are disposed relative to the direction of movement of the equipment over a field. It will be further appreciated that either caster assembly 25 may be easily adapted for use in supporting and driving any desired mobile equipment needing support and driving means other than might be supplied by pulling equipment, such as a tractor or the like.

It will be appreciated that the output shaft 62 may be operatively connected, if desired, to the drive shaft of a conventional motor or engine, not shown, which may be suitably mounted on the tool bars 8 or 20, to impart driving rotation to the wheel 39. In this event, the chain 67 would be removed from the sprocket 68 and operatively connected to a sprocket wheel on the drive shaft of the motor. With such an arrangement, it is advisable to provide steering mechanism for the caster wheel 39; and such may be easily connected to the caster frame 33 or tubular spindle 37 by gearing or other well known means.

This invention has been thoroughly tested and found to be completely satisfactory for the accomplishment of the objectives set forth and apparent from the description; and, while I have shown and described a commercial embodiment of my rotary drive mechanism, it will be the that the same is capable of modification without departure from the spirit and scope of the invention, as defined in the claims.

What is claimed is:

1. A rotary drive mechanism comprising:
   a. a mobile frame structure;
   b. a caster including a caster frame having upper and lower end portions, said upper end portion being pivotally connected to the frame structure for unlimited rotary movement relative to the frame structure on a generally vertical axis, and a ground engaging rotary member rotatively mounted on said lower end portion on an axis laterally and angularly displaced from said generally vertical axis;

c. a power transmission shaft member journaled for rotation relative to said frame structure and caster frame on said generally vertical axis of rotary movement of the caster frame;

d. power transmission elements connecting said rotary member and one end of said power transmission shaft member for imparting rotation to one of said members responsive to rotation of the other of said members;

e. and a power transmitting member on said shaft member adapted to be operatively connected with a rotary device carried by said mobile frame structure for transmitting rotary movement between said shaft member and said rotary device.

2. The rotary drive mechanism defined in claim 1 in which said caster frame upper end portion defines a generally vertically extended passage therethrough, said power transmission shaft member extending axially through said passage and being journaled therein.

3. The rotary drive mechanism defined in claim 1 in which said frame structure defines a generally vertically extended opening, said caster frame upper end portion comprising a tubular stem extending axially of and being journaled in said opening, said power transmission shaft member extending axially through said stem and journaled therein.

4. The rotary drive mechanism defined in claim 1 in which said power transmission elements include a jackshaft journaled in said caster frame in spaced parallel relation to the axis of said rotary member, aligned toothed wheels one operatively engaging said rotary member and the other mounted on said jackshaft, an endless link chain entrained over said toothed wheels, and intermeshing gears on said jackshaft and power transmission shaft member.

5. The rotary drive mechanism defined in claim 1 in which said caster frame includes a pair of laterally spaced legs extending generally downwardly from said upper end portion and defining said lower end portion, said rotary member comprising a wheel journaled between said legs.

6. The rotary drive mechanism defined in claim 5 in which said power transmission elements include a jackshaft journaled in said caster frame in spaced parallel relation to the axis of said wheel, aligned toothed wheels one operatively connected to said wheel and the other mounted on said jackshaft, an endless link chain entrained over said toothed wheels, and intermeshing gears on said jackshaft and the lower end of said power transmission shaft member.

7. The rotary drive mechanism defined in claim 1 in which said power transmitting member comprises a gear, characterized by an output shaft journaled in said mobile frame structure, and a second gear on said output shaft having intermeshing engagement with said first mentioned gear.

8. The rotary drive mechanism defined in claim 1 in which said frame structure defines a vertically extended opening, said upper end portion of the caster frame including a tubular member extending axially of and journaled in said vertically extended opening, said caster frame including a pair of laterally spaced legs extending generally downwardly from said upper end portion and defining said lower end portion, said rotary member comprising a wheel disposed between said legs, said power transmission shaft member extending axially within and being journaled in said tubular member.

9. The rotary drive mechanism defined in claim 8 in which said wheel is rotatably mounted between said legs by an axle on which said wheel is rigidly secured, said axle being journaled in said legs, said power transmission connections including, a jackshaft rotatively mounted on one of said legs in generally upwardly spaced parallel relation to said axle, a pair of aligned toothed wheels, one each rigidly mounted on a different one of said jackshaft and axle, an endless link chain entrained over said toothed wheels, and gearing connecting said jackshaft to said power transmission shaft member.

10. The rotary drive mechanism defined in claim 1 in which said power transmitting member is secured to the upper end of said power transmission shaft member for common rotation therewith, said rotary device being operatively coupled to said power transmitting member to be rotated thereby responsive to rotary travel of said ground engaging member over the ground.

* * * * *